US 6,704,358 B1

(12) United States Patent
Li et al.

(10) Patent No.: US 6,704,358 B1
(45) Date of Patent: *Mar. 9, 2004

(54) METHOD AND APPARATUS FOR RESIZING IMAGE INFORMATION

(75) Inventors: Shipeng Li, Princeton, NJ (US); Keren Hu, Princeton, NJ (US); Dinei Afonso Ferreira Florencio, Plainsboro, NJ (US)

(73) Assignees: Sarnoff Corporation, Princeton, NJ (US); Motorola, Inc., Schaumburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/234,249

(22) Filed: Jan. 20, 1999

Related U.S. Application Data

(63) Continuation-in-part of application No. 09/160,789, filed on Sep. 25, 1998, now Pat. No. 6,310,919.
(60) Provisional application No. 60/084,632, filed on May 7, 1998.

(51) Int. Cl.[7] .............................................. H04N 7/12
(52) U.S. Cl. ................................................. 375/240.02
(58) Field of Search ..................... 375/240.02, 240.12, 375/240.21, 240.19, 240.2, 240, 23, 240.29; 382/236, 238, 245, 191, 240; H04N 7/12

(56) References Cited

U.S. PATENT DOCUMENTS

| 5,262,854 | A | | 11/1993 | Ng ................................ 358/133 |
| 5,355,328 | A | | 10/1994 | Arbeiter et al. ............. 364/724.1 |
| 5,644,361 | A | * | 7/1997 | Ran et al. ................. 375/240.16 |
| 5,777,677 | A | | 7/1998 | Linzer et al. ................. 348/397 |
| 5,818,530 | A | * | 10/1998 | Canfield et al. ............. 348/400 |
| 6,057,847 | A | * | 5/2000 | Jenkins ....................... 345/422 |
| 6,125,147 | A | * | 9/2000 | Florencio et al. ...... 375/240.29 |
| 6,222,944 | B1 | * | 4/2001 | Li et al. ...................... 382/250 |
| 6,233,277 | B1 | * | 5/2001 | Ozcelik et al. ......... 375/240.02 |
| 6,310,919 | B1 | * | 10/2001 | Florencio ............... 375/240.16 |
| 6,442,202 | B1 | * | 8/2002 | Borer ..................... 375/240.16 |
| 6,456,661 | B1 | * | 9/2002 | Morel .................... 375/240.16 |
| 6,549,577 | B2 | * | 4/2003 | Florencio et al. ...... 375/240.21 |

FOREIGN PATENT DOCUMENTS

| DE | 0 753 967 A2 | 6/1996 |
| EP | 0 863 674 A2 | 9/1998 |

OTHER PUBLICATIONS

Shih–Fu Chang et al: "Manipulation and Composition of MC–DCT Compressed Video" IEEE Journal on Selected Areas in Communications, vol. 13, No. 1, Jan. 1, 1995, pp. 1–11, XP000492740 ISSN: 0733–8716 ★p. 4, right–hand column, paragraph D.

Bhaskaran V: "Mediaprocessing in the Compressed Domain" Digest of Papers. COMPCON, Jan. 1, 1996, pp. 204–209, XP000578934 ★p. 206, left–hand column, paragraph 2.2★.

Boucherok F et al: "Compatible Multi–Resolution Coding Scheme" Signal Processing of HDTV. Proceedings of the International Workshop on HDTV, Nov. 18, 1992, pp. 561–568, XP000618398.

Vial J F et al: "In –Band Interpolation Applied to Motion–Compensated Subband Coding" Signal Processing of HDTV, 3, Turin, Sep. 4–6, 1991 No. Workshop 4, Sep. 4, 1991, pp. 207–214, XP000379956 Yasuda H; Chiariglione L.

European Patent Search Application EP 99 30 3568 corresponding to US 09/234,249.

"HDTV Down–Conversion Decoder" J. Bao et al., IEEE Transactions on Consumer Electronics, vol. 42, No. 3, Aug. 1996, pp. 402–409.

* cited by examiner

Primary Examiner—Nhon Diep
(74) Attorney, Agent, or Firm—William J. Burke

(57) ABSTRACT

A method and apparatus for adapting scaled pixel blocks such that the resolution, or grid size, of associated motion vector information is substantially the same. Also disclosed are various techniques for producing and processing the scaled pixel blocks such that memory resources and/or processing resources are efficiently utilized.

24 Claims, 9 Drawing Sheets

METHOD AND APPARATUS FOR RESIZING IMAGE INFORMATION

This application claims the benefit of U.S. Provisional Application No. 60/084,632, filed May 7, 1998.

This application is a continuation in part of U.S. patent application Ser. No. 09/160,789, filed on Sep. 25, 1998 now U.S. Pat. No. 6,310,919 for METHOD AND APPARATUS FOR ADAPTIVELY SCALING MOTION VECTOR INFORMATION IN AN INFORMATION STREAM DECODER, which is herein incorporated by reference in its entirety.

The invention relates to communications systems generally and, more particularly, the invention relates to a method and apparatus for resizing image and motion vector information in an information stream decoder, such as an MPEG-like video decoder.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

In a typical MPEG decoder, predictive coded pixel blocks (i.e., blocks that comprise one or more motion vectors and a residual error component) are decoded with respect to a reference frame (i.e., an anchor frame). The anchor frame is stored in an anchor frame memory within the decoder, typically a dual frame memory. As each block of an anchor frame is decoded, the decoded block is coupled to a first portion of the dual frame memory. When an entire anchor frame has been decoded, the decoded blocks stored in the first portion of the dual frame memory are coupled to a second portion of the dual frame memory. Thus, the second portion of the dual frame memory is used to store the most recent full anchor frame, which is in turn used by a motion compensation portion of the decoder as the reference frame for decoding predictive coded blocks.

To reduce the amount of memory required to implement the above anchor frame memory, it is known to compress (i.e., resize) anchor frame image information prior to storage in the anchor frame memory. To ensure accurate prediction using such resized reference image information, it is necessary to correspondingly resize the prediction motion vectors that will utilize the resized reference image information. Present arrangements providing such resizing of images and related motion vector information do not produce satisfactory results under all conditions. Specifically, present arrangements do not function properly in the presence of field prediction encoded macroblocks including inter-field motion vectors.

Therefore, it is seen to be desirable to provide a method and apparatus that significantly reduces the memory and memory bandwidth required to decode a video image while substantially retaining the quality of a resulting full-resolution or downsized video image. Specifically, it is seen be desirable to provide such a reduction in memory and memory bandwidth even in the presence of field-predictive encoded macroblocks.

SUMMARY OF THE INVENTION

The invention comprises a method and apparatus for adapting scaled pixel blocks such that the resolution, or grid size, of associated motion vector information is substantially the same. Also disclosed are various techniques for producing and processing the scaled pixel blocks such that memory resources and/or processing resources are efficiently utilized.

Specifically, in a block-based system for decoding a compressed information stream including predicted pixel blocks, the predicted pixel blocks being associated with one or more scaled reference pixel blocks via respective scaled motion vector information, a method according to the invention for adapting a first resolution of a scaled reference pixel block to a second resolution of said scaled motion vector information comprises the step of filtering, using a discrete cosine transform (DCT) filter, the scaled reference pixel block.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a video decoder, illustratively an MPEG-2 video decoder. However, it will be apparent to those skilled in the art that the invention is applicable to any video processing system, including those systems adapted to DVB, MPEG-1, MPEG-2 and other information streams. The invention is particularly well suited to systems utilizing inter-field motion vector prediction.

Specifically, the invention will be primarily described within the context of an MPEG-like decoding system that receives and decodes a compressed video information stream IN to produce a video output stream OUT. The invention operates to reduce memory and memory bandwidth requirements in the MPEG-like decoder by compressing image information prior to storage such that a reduced resolution image information frame is stored and subsequently utilized by, e.g., a motion compensation module of the decoder. The invention processes motion vector information in a manner consistent with the amount of compression imparted to a predicted image information frame, and the type of prediction employed in forming the predicted information frame.

It should be noted that the term scaling factor is intended to include the terms horizontal scaling factor and vertical scaling factor. Thus, a horizontal parameter modified by a scaling factor is actually modified by a horizontal scaling factor (or scaling factor component).

Figure 4A:
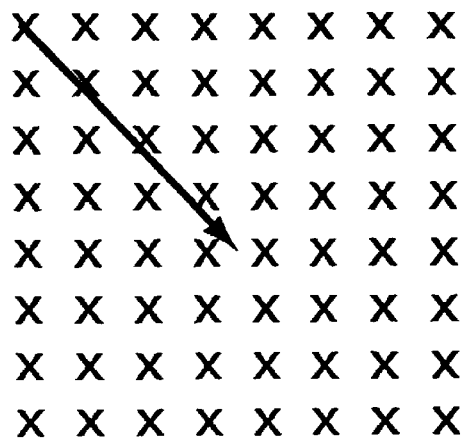
FIG. 4A is graphical depiction of an 8×8 non-interlaced pixel block having an associated frame-prediction mode motion vector.
Figure 4B:
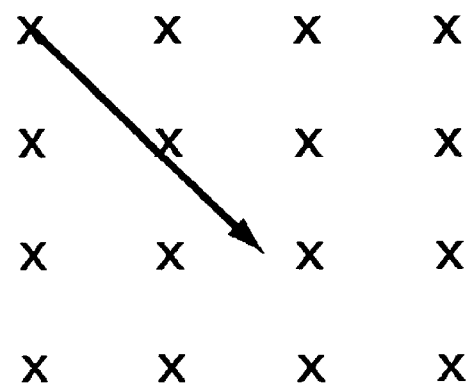
FIG. 4B is a graphical description of a scaled version of the 8×8 non-interlaced pixel block and associated motion vector of FIG. 4A.

FIG. 4A is graphical depiction of an 8×8 non-interlaced pixel block having an associated frame-prediction mode motion vector. FIG. 4B is a graphical description of a scaled version (vertical scaling factor and horizontal scaling factor of two) of the 8×8 non-interlaced pixel block (i.e., a 4×4 non-interlaced pixel block) and associated motion vector of FIG. 4A. The motion vector associated with the 8×8 pixel block of FIG. 4A has a horizontal displacement of 3.5 pixels, and a vertical displacement of four lines. The corresponding scaled motion vector of FIG. 4B has, appropriately, a horizontal displacement of 1.75 pixels, and a vertical displacement of two lines. Thus, both pixel and motion vector information have scaled appropriately in the representations of FIG. 4A and FIG. 4B.

Figure 1:
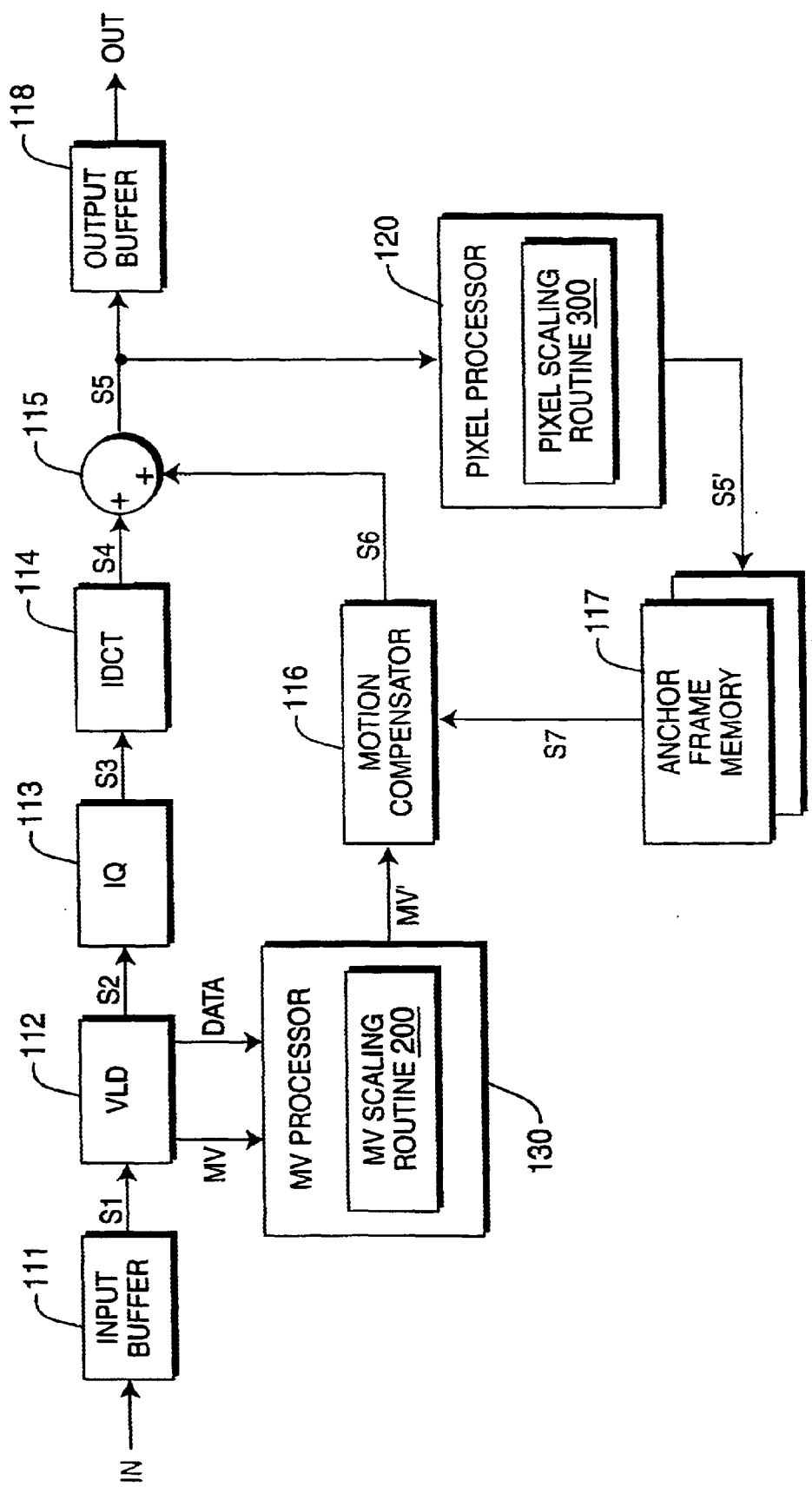
FIG. 1 depicts a high level block diagram of an MPEG-like decoder.

As depicted in above with respect to FIG. 4A and FIG. 4B, if the only prediction mode is used is a frame prediction mode, than the same vertical scaling factor $SF_V$ and horizontal scaling factor $SF_H$ is used to scale the reference pixel blocks and the motion vectors used to form predicted pixel blocks using the scaled reference blocks (e.g., by the motion compensation module 116 of FIG. 1).

Figure 5A:
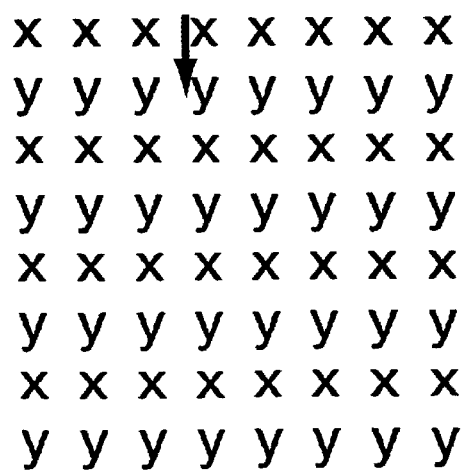
FIG. 5A is graphical depiction of an 8×8 interlaced pixel block having an associated field-prediction mode motion vector.
Figure 5:
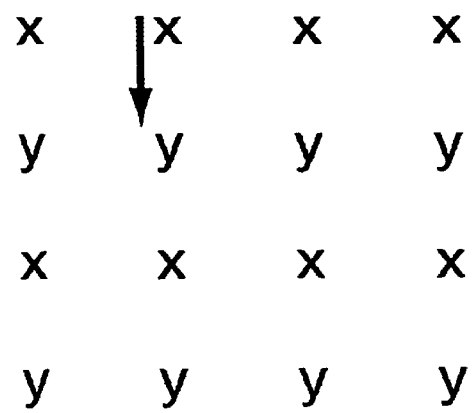
FIG. 5B is a graphical description of a scaled version of the 8×8 interlaced pixel block and associated motion vector of FIG. 5A.

FIG. 5A is graphical depiction of an 8×8 interlaced pixel block having an associated field-prediction mode motion vector. FIG. 5B is a graphical description of a scaled version (SCALE FACTOR=2) of the 8×8 interlaced pixel block (i.e., a 4×4 interlaced pixel block) and associated motion vector of FIG. 5A. The motion vector associated with the 8×8 pixel block of FIG. 5A comprises a (0,0) motion vector. That is, the motion vector points from the first line in the first field to the first line in the second field. Furthermore, since the motion vector is coded as a (0,0) motion vector, a simple scaling of the motion vector will result in a value of zero. That is, the resulting scaled motion vector will also be a (0,0) motion vector.

When using the scaled (0,0) motion vector to predict the motion of a scaled macroblock, the resulting prediction will be incorrect. This is because the scaled motion vector will point from the first line in the first field to the first line in the second field. However, since the macroblock has been scaled, it is likely that the motion vector should point to a different line.

Referring now to FIG. 5B (a 2:1 scaled version of FIG. 5A), the pixel domain information has been properly scaled, but the (0,0) motion vector value is representative of an incorrect vertical displacement of the motion vector. If properly interpolated, the scaled motion vector value would result in a motion vector that pointed to a half-pel above the first line of the second field. However, since a (0,0) motion vector was scaled, resulting in a (0,0) motion vector, the scaled motion vector points to the first line in the second field. Thus, in attempting to scale the motion vector by a factor of two, the vertical displacement parameter of the motion vector has been effectively doubled. As such, the scaled motion vector is not appropriate to the scaled pixel information. As such, any predictions using this motion vector will result in, e.g., undesirable visual artifacts upon presentation of the decoded images.

In view of the foregoing discussion, it can be readily appreciated that, in the case of inter-field motion vector prediction, the "divide by 2" approach or, more generally, the "scale motion vectors as the pixel information is scaled" approach, results in a vertical displacement shift proportional to the vertical scaling factor $SF_V$ used, and which depends of the parity of the source and destination fields. That is, in the case of 2:1 compression, such as depicted in FIGS. 5A and 5B, a one line shift of the "actual" motion vector occurs. This same shifting by an appropriate constant factor will occur when resizing any motion vector within the context of inter-field motion vector prediction.

To compensate for this shifting of motion vectors when using inter-field motion vector prediction, the present invention utilizes a scaling factor representative of the ratio between the two sampling distances. For example, in the case of a vertical scaling factor $SF_V$ of two (i.e., 2:1 vertical compression), the vertical component of the motion vector is resized such that the appropriate scaled vertical displacement of the motion vector is utilized.

It is important to note that the vertical displacement shift described above differs for motion vectors pointing from top fields to bottom fields and from motion vectors pointing from bottom fields to top fields. That is, in a case of a motion vector pointing from a top field to a bottom field, a scaled motion vector will have a positive shift in vertical displacement. Therefore, for the case of a motion vector pointing from a top field to a bottom field, in addition to scaling the motion vector according to the pixel scaling factor, the positive vertical displacement must be offset. Similarly, in a case of a motion vector pointing from a bottom field to a top field, the scaled motion vector will have a negative vertical displacement. Therefore, for the case of a motion vector pointing from a bottom field to a top field, in addition to scaling the motion vector according to the pixel scaling factor, the negative vertical displacement must be offset.

FIG. 1 depicts an embodiment of an MPEG-like decoder 100. Specifically, the decoder 100 of FIG. 1 receives and decodes a compressed video information stream IN to produce a video output stream OUT. The video output stream OUT is suitable for coupling to, e.g., a display driver circuit within a presentation device (not shown).

The MPEG-like decoder 100 comprises an input buffer memory module 111, a variable length decoder (VLD) module 112, an inverse quantizer (IQ) module 113, an inverse discrete cosine transform (IDCT) module 114, a summer 115, a motion compensation module 116, an output buffer module 118, an anchor frame memory module 117, a pixel processor 120 and a motion vector (MV) processor 130.

The input buffer memory module 111 receives the compressed video stream IN, illustratively a variable length encoded bitstream representing, e.g., a high definition television signal (HDTV) or standard definition television signal (SDTV) output from a transport demultiplexer/decoder circuit (not shown). The input buffer memory module 111 is used to temporarily store the received compressed video stream IN until the variable length decoder module 112 is ready to accept the video data for processing. The VLD 112 has an input coupled to a data output of the input buffer memory module 111 to retrieve, e.g., the stored variable length encoded video data as data stream S1.

The VLD 112 decodes the retrieved data to produce a constant length bit stream S2 comprising quantized prediction error DCT coefficients, a motion vector stream MV and a block information stream DATA. The IQ module 113 performs an inverse quantization operation upon constant length bit stream S2 to produce a bit stream S3 comprising quantized prediction error coefficients in standard form. The IDCT module 114 performs an inverse discrete cosine transform operation upon bit stream S3 to produce a bitstream S4 comprising pixel-by-pixel prediction errors.

The summer 115 adds the pixel-by-pixel prediction error stream S4 to a motion compensated predicted pixel value stream S6 produced by the motion compensation module 116. Thus, the output of summer 115 is, in the exemplary embodiment, a video stream S5 comprising reconstructed pixel values. The video stream S5 produced by summer 115 is coupled to the pixel processor 120 and the output buffer module 118.

The pixel processor 120 compresses the video stream S5 according to vertical $SF_V$ and horizontal $SF_H$ scaling factors to produce a compressed video stream S5' having a compression ratio of $1:(SF_V*SF_H)$. The pixel processor 120 operates on a pixel block by pixel block basis (e.g., a 4×4, 4×8 or 8×8 pixel block) to compress each pixel block forming an anchor frame such that a resulting compressed anchor frame is provided to the anchor frame memory as compressed video stream S5'. Thus, the memory requirements of anchor frame memory module 117 are reduced by a factor of $SF=SF_V*SF_H$.

In one embodiment of the pixel processor 120, a pixel block is compressed by subjecting the pixel block to a discrete cosine transform (DCT) to produce a DCT coefficient block. A portion (typically high order coefficients) of the DCT coefficient block is then truncated. The remaining DCT coefficients are then subjected to an inverse DCT to produce a reduced resolution pixel block. The amount of reduction in resolution is determined by the number of DCT coefficients used to reconstruct the truncated pixel block.

In another embodiment of the pixel processor 120, an 8×8 pixel block is subjected to a DCT process to produce a respective 8×8 DCT coefficient block. If half of the DCT coefficients are truncated, and the remaining DCT coefficients are subjected to the IDCT processing, then the resulting pixel block will have approximately half the resolution (i.e., a 2:1 compression ratio) of the initial pixel block (i.e., a 4×8 or 8×4 pixel block). Similarly, if three fourths of the DCT coefficients are truncated, and the remaining DCT coefficients are subjected to the IDCT processing, then the resulting pixel block will have approximately one fourth the resolution (i.e., a 4:1 compression ratio) of the initial pixel block (i.e., a 4×4 pixel block).

In another embodiment of the pixel processor 120, a decimation or sub-sampling process is used. That is, a particular compression ratio is achieved by selectively removing pixels from an image represented by pixel information within video stream S5. For example, to achieve a 4:1 compression ratio of an image, every other scan line of an image is removed, and every other pixel of the remaining scan lines is removed. In this embodiment, pixel processor 120 operates to sub-sample, or decimate, the pixel information within video stream S5 to effect a resizing (i.e., downsizing) of the video image represented by the pixel data.

The anchor frame memory module 117 receives and stores the compressed video stream S5'. Advantageously, the size of the anchor frame memory module 117 may be reduced by an amount consistent with the compression ratio utilized by the pixel processor 120.

The motion vector processor 130 receives the motion vector stream MV and block information stream DATA from the VLD 112. The motion vector stream MV comprises motion vector information to be used by the motion compensation module 116 to predict individual macroblocks based upon image information stored in the anchor frame memory module. However, since the image information stored in the anchor frame memory module 117 has been scaled by the pixel processing unit 120 as described above, it is also necessary to scale motion vector data used to predict macroblocks using the scaled pixel information. The scaled motion vectors MV are coupled to the motion compensation module 116 via path MV'.

The motion compensation module 116 accesses the compressed (i.e., scaled) image information stored in memory module 117 via signal path S7' and the scaled motion vector(s) MV' to produce a scaled predicted macroblock. That is, the motion compensation module 116 utilizes one or more stored anchor frames (e.g., the reduced resolution pixel blocks generated with respect to the most recent I-frame or P-frame of the video signal produced at the output of the summer 115), and the motion vector(s) MV' received from the motion vector processor 130, to calculate the values for each of a plurality of scaled predicted macroblocks forming a scaled predicted information stream.

Each scaled predicted macroblock is then processed by the motion compensation module 116 or by an inverse pixel processing module (not shown) following the motion compensation module 116 in a manner inverse to the processing of the pixel processor 120. For example, in the case of the pixel processor 120 performing a down-sampling or decimation of the video stream S5 produced by summer 115, the motion compensation module 116 performs an up-sampling or interpolation of the scaled predicted macroblock to produce a full resolution predicted macroblock. Each of the full resolution predicted macroblock are then coupled to an input of adder 115 as motion compensated predicted pixel value stream S6.

Figure 2:
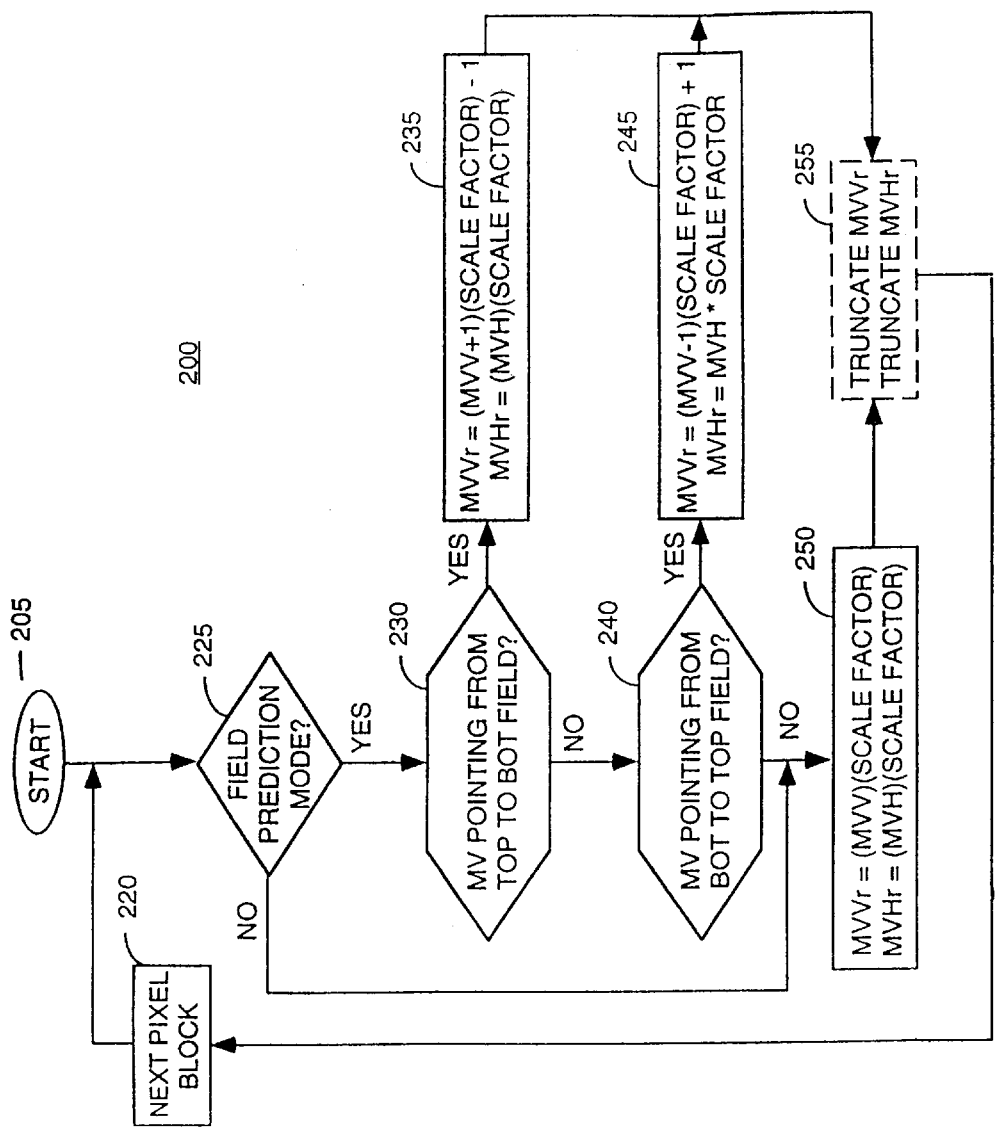
FIG. 2 depicts a flow diagram of a motion vector scaling method suitable for use in the MPEG-like decoder of FIG. 1.

The operation of the motion vector processor 130 will now be described in more detail with respect to FIG. 2. FIG. 2 depicts a flow diagram of a motion vector scaling method 200 suitable for use in the MPEG-like decoder 100 of FIG. 1. Specifically, FIG. 2 depicts a flow diagram of a motion vector scaling method 200 suitable for use in the motion vector processor 130 of the MPEG-like decoder 100 of FIG. 1.

The motion vector scaling method 200 operates to scale motion vectors associated with a predicted frame (i.e., a P-frame or B-frame) to be processed by the motion compensation module 116. As previously discussed, to properly reconstruct a predicted macroblock using such a reduced resolution anchor frame, it is necessary to appropriately scale the motion vectors associated with the predicted macroblock. The motion vector scaling method 200 adaptively scales the motion vector(s) in response to the vertical $SF_V$ and horizontal $SF_H$ scaling factors used by the pixel processor 120 and the type of motion compensation (i.e., frame mode, intra-field mode or inter-field mode) originally used to from the predicted macroblock.

The motion vector scaling method 200 is entered at step 205, when, e.g., a predicted macroblock to be decoded is received by the variable length decoder 112, which responsively extracts motion vector(s) MV and motion vector mode information DATA from the received macroblock. The motion vector(s) MV and motion vector mode information DATA is coupled to the motion vector processor 130, as previously described. The method 200 then proceeds to step 225.

At step 225 a query is made as to whether the motion vector(s) MV associated with the received macroblock are associated with a field prediction mode. That is, a query is made as to whether motion vector mode information DATA identifies the prediction methodology used for the received macroblock as the field prediction mode. For example, in the case of an MPEG-2 macroblock, a field-motion-type field within a header portion of the macroblock may be examined. If the query at step 225 is answered negatively, then the method 200 proceeds to step 250. If the query at step 225 is answered affirmatively, then the method 200 proceeds to step 230.

At step 250 the vertical and horizontal displacement components of he received motion vector(s) are scaled per equations 1 and 2 (below), here:

MVV is the vertical displacement component of the received motion vector;

MVH is the horizontal displacement component of the received motion vector;

MVVr is the scaled vertical displacement component of the motion vector;

MVHr is the scaled horizontal displacement component of the motion vector; and

SCALE FACTOR is the scaling factor used by, e.g., pixel processor 120 to scale the pixel blocks forming the reference frame. In the case horizontal scaling, SCALE FACTOR is equal to the horizontal scale factor $SF_H$, while in the case of vertical scaling, SCALE FACTOR is equal to the vertical scale factor $SF_V$.

After scaling the vertical and horizontal displacement components of the received motion vector(s) per equations 1 and 2, the method 200 proceeds to step 255.

$$MVVr = MVV \times \text{SCALEFACTOR} \qquad \text{(equation 1)}$$

$$MVHr = MVH \times \text{SCALEFACTOR} \qquad \text{(equation 2)}$$

At step 230 a query is made as to whether the received motion vector information comprises a motion vector pointing from a top field to a bottom field. If the query at step 230 is answered negatively, then the method 200 proceeds to step 240. If the query at step 230 is answered affirmatively, then the method 200 proceeds to step 235, where the vertical and horizontal displacement components of the received motion vector(s) are scaled per equations 3 (below) and 2 (above). The method 200 then proceeds to optional step 255.

$$MVVr = [(MVV+1) \times (\text{SCALEFACTOR})] - 1 \qquad \text{(equation 3)}$$

At step 240 a query is made as to whether the received motion vector information comprises a motion vector pointing from a bottom field-to a top field. If the query at step 240 is answered negatively, then the method 200 proceeds to step 250. If the query at step 240 is answered affirmatively, then the method 200 proceeds to step 245, where the vertical and horizontal displacement components of the received motion vector(s) are scaled per equations 4 (below) and 2 (above). The method 200 then proceeds to optional step 255.

$$MVVr = [(MVV-1) \times (\text{SCALEFACTOR})] + 1 \qquad \text{(equation 4)}$$

At optional step 255 the scaled vertical (MVVr) and horizontal (MVHr) displacement components of the received motion vector(s) are truncated to conform to, e.g., the half pel resolution of an MPEG-like decoding system. Alternatively, the MPEG-like decoder may keep the increased resolution of the motion vectors by utilizing a finer prediction grid or coordinate system. The method 200 then proceeds to step 220, to await reception of the next predicted pixel block by the VLD 112.

Figure 3A:
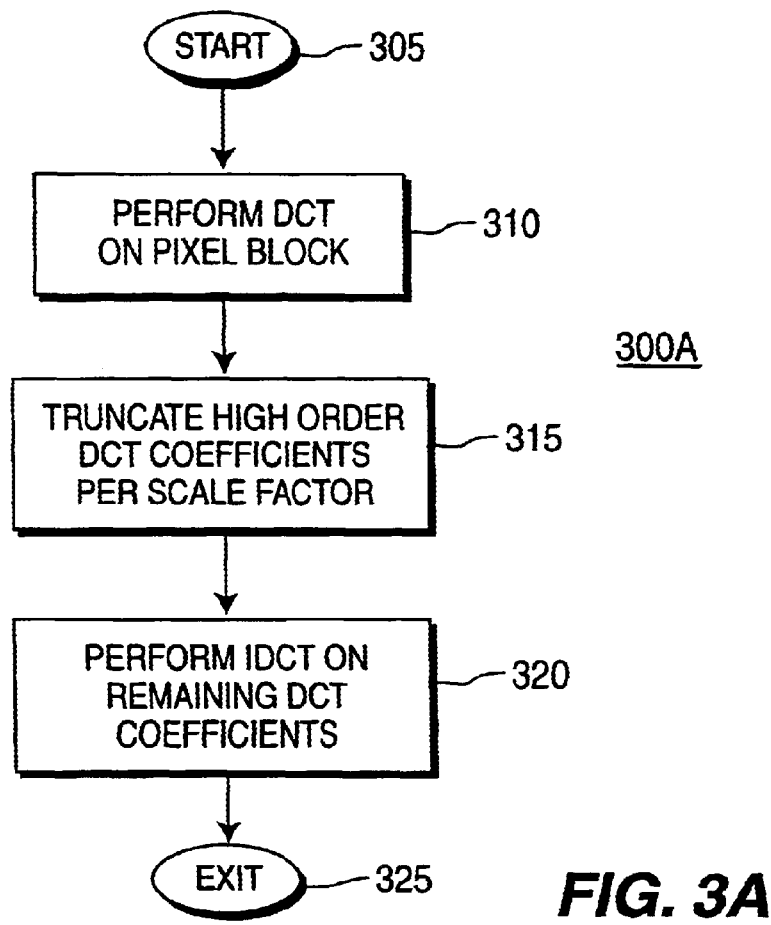
FIG. 3A and FIG. 3B are flow diagrams of image compression methods suitable for use in the MPEG-like decoder of FIG. 1.

FIG. 3A depicts a pixel scaling method 300A suitable for use in the pixel processor 120 of FIG. 1. The pixel scaling method 300A is entered at step 305, when a pixel block, illustratively an 8×8 pixel block is received by pixel processor 120 via video stream S5. The method 300A then proceeds to step 310, where a discrete cosine transform (DCT) is performed on the received pixel block. For example, in the case of an 8×8 pixel block, a two dimensional DCT (or a plurality of one dimensional DCTs) is performed on the received pixel block to produce an 8×8 DCT coefficient block. The method 300A then proceeds to step 315.

At step 315 a plurality of DCT coefficients are truncated per the vertical $SF_V$ and horizontal $SF_H$ scaling factors. For example, in the case of a vertical scaling factor $SF_V$ of two and a horizontal scaling factor $SF_H$ of two (i.e., 4:1 compression) the higher order vertical and higher order horizontal DCT coefficients are truncated (i.e., the upper three fourths of the DCT coefficients). The method 300A then proceeds to step 320.

At step 320 an inverse DCT is performed on the remaining DCT coefficients to produce a reconstructed pixel block comprising a subset of the pixel information within the received pixel block. For example, in the case of an 8×8 pixel block undergoing 2:1 compression, the 32 DCT coefficients representing the higher vertical or horizontal spatial frequency information of the received pixel block are truncated at step 315. The remaining 32 DCT coefficients are subjected to the IDCT processing at step 320 to produce a 32 pixel block (i.e., a 4×8 or 8×4 pixel block). In a case of 4:1 compression of a received 8×8 pixel block, where all DCT coefficients except the 16 lower frequency DCT coefficients truncated, the 16 DCT coefficients representing the lower vertical and horizontal spatial frequency information of the received pixel block are subjected to an inverse DCT process to produce a 4×4 pixel block. The method 300A then proceeds to step 325, where it is exited.

Figure 3B:
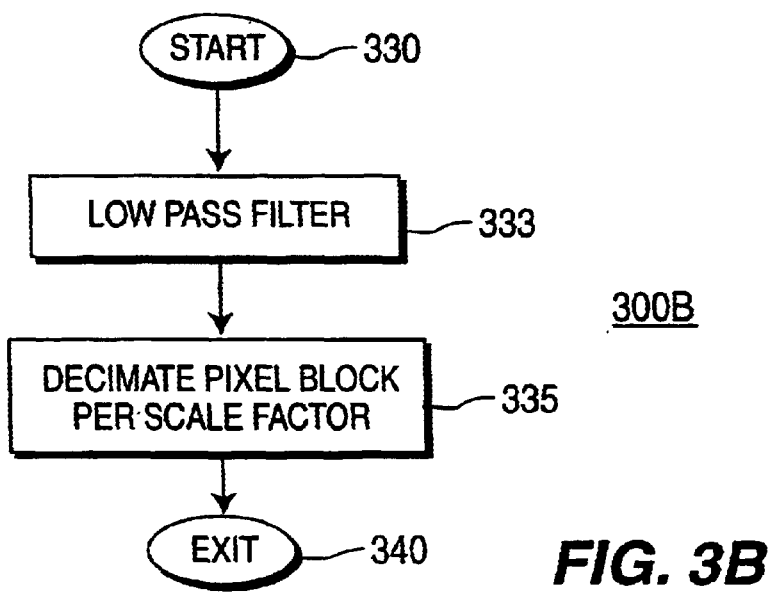

FIG. 3B represents an alternate embodiment of the pixel scaling method 300 of pixel processor 120. Specifically, the method 300b of FIG. 3B is entered at step 330, when a pixel block is received by pixel processor 120. The method 300B proceeds to step 333, where the received pixel block is low pass filtered, and to step 335, where the received pixel block is decimated or sub-sampled according to the vertical scaling factor $SF_V$ and horizontal scaling factor $SF_H$ to achieve an appropriate compression ratio. For example, pixels and/or lines of pixels are deleted from the video information stream S5 to produce a reduced pixel (i.e., compressed) video stream S5'.

As noted above with respect to the motion vector scaling method 200 of FIG. 2, it is necessary to adapt the resolution of the scaled motion vectors to the resolution (i.e., grid size) of the reference pixel information utilized by the motion compensation module 116. For example, in the case of scaling the pixel and associated motion vector information by one half, the nominal ½ pel resolution of the motion vectors becomes ¼ pel resolution. However, the prediction grid associated with the half scaled pixel information does not become finer. Thus, the additional resolution of the scaled motion vectors is not used (i.e., truncated to, e.g., ½ pel resolution, per optional step 255 of the motion vector scaling method 200) or a finer prediction grid or coordinate system must be provided.

According to an embodiment of the invention to be discussed below with respect to FIGS. 6 and 7, such a finer prediction grid or coordinate system is provided by adapting the compressed (i.e., scaled) reference image information stored in the anchor frame memory 117 to the resolution of the scaled motion vectors produced by the motion vector processor 130.

Figure 6:
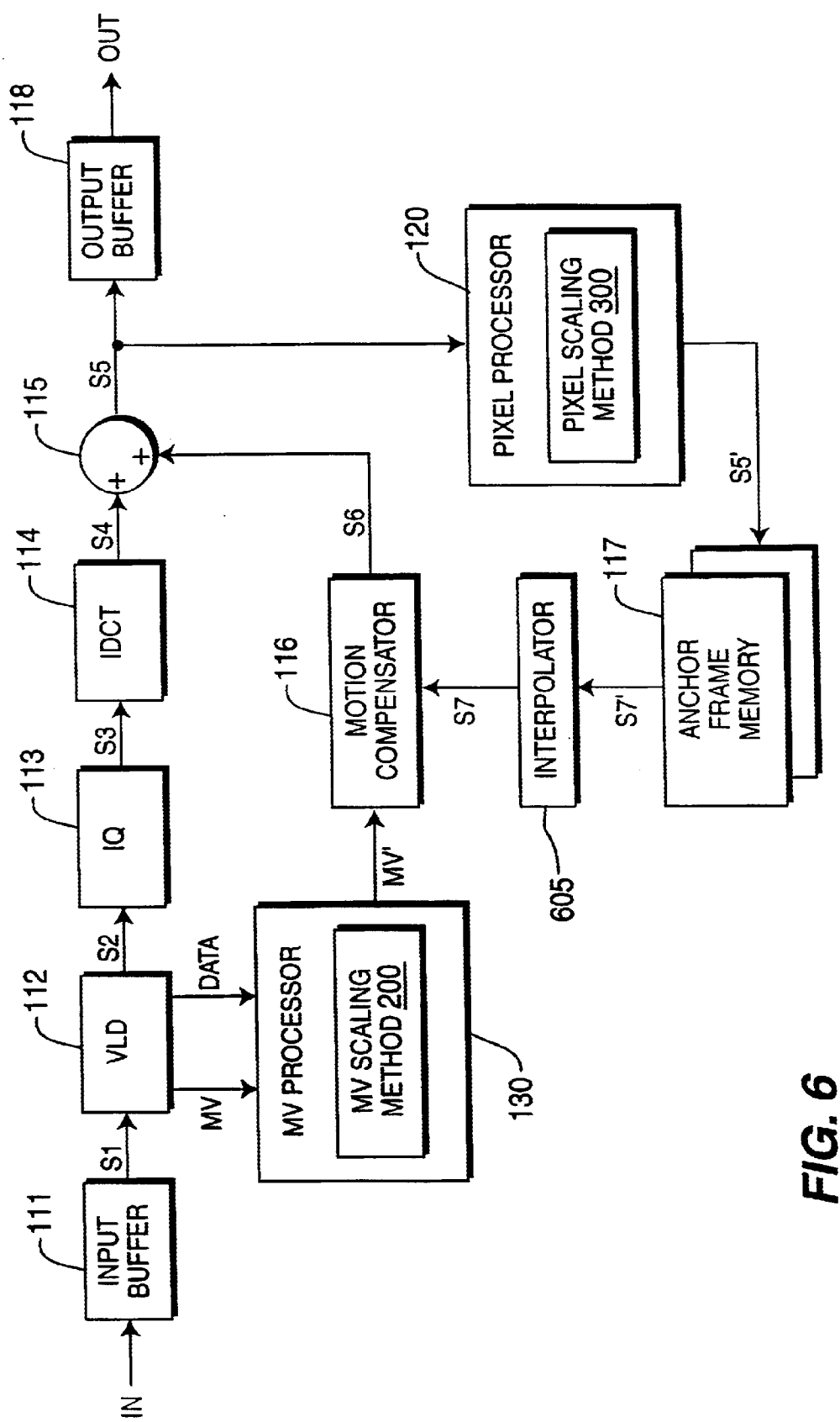
FIG. 6 depicts a high level block diagram of an alternate embodiment of an MPEG-like decoder.

FIG. 6 depicts an alternate embodiment of an MPEG-like decoder 600. Specifically, the decoder 600 of FIG. 6 receives and decodes a compressed video information stream IN to produce a video output stream OUT that is suitable for coupling to, e.g., a display driver circuit within a presentation device (not shown).

The MPEG-like decoder 600 comprises an input buffer memory module 111, a variable length decoder (VLD) module 112, an inverse quantizer (IQ) module 113, an inverse discrete cosine transform (IDCT) module 114, a summer 115, a motion compensation module 116, an output buffer module 118, an anchor frame memory module 117, a pixel processor 120, a motion vector (MV) processor 130 and an interpolator 605.

Since the majority of the elements of the MPEG-like decoder 600 of FIG. 6 operate in substantially the same manner as corresponding elements in the MPEG-like decoder 100 of FIG. 1, only the differences between the two figures will be discussed in detail. For example, the MPEG-like decoder 600 of FIG. 6 includes an interpolator 605, whereas the MPEG-like decoder 100 of FIG. 1 does not.

Figure 7:
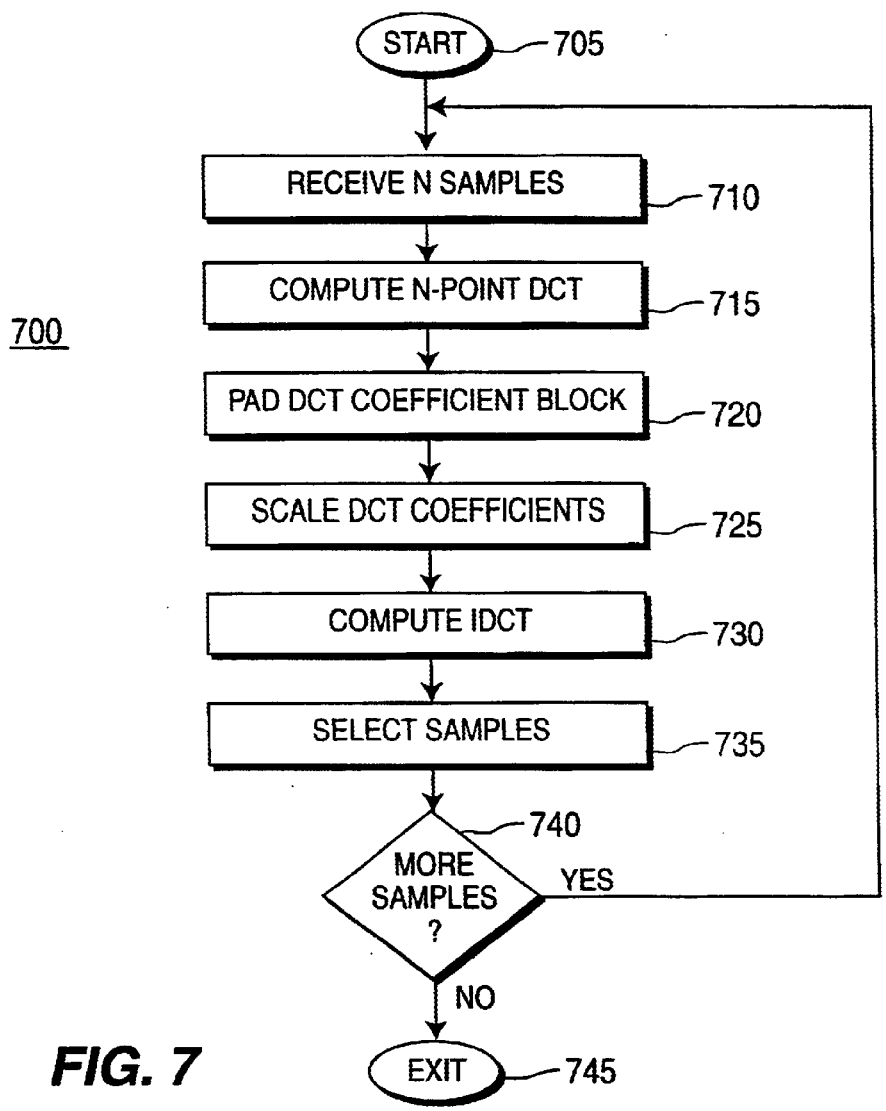
FIG. 7 depicts a flow diagram of a DCT-based interpolation filter method.

The interpolator 605, as will be described in more detail below with respect to FIG. 7, is used adapt the compressed (i.e., scaled) reference image information stored in the anchor frame memory 117 to the resolution of the scaled motion vectors produced by the motion vector processor 130. For example, in the case of scaling 8×8 pixel blocks and associated motion vector information using a vertical scaling factor $SF_V$ of two and a horizontal scaling factor $SF_H$ of two, the resultant 4×4 pixel blocks must be upsampled, or interpolated to form 8×8 pixel blocks.

One technique commonly used to provide upsampling or interpolation is the known bi-linear interpolation technique. Using this technique, each new pixel sample is computed using its four nearest neighbors, per equation 5 (below), where:

r[i,j] is the reference pixel in row "i" and column "j";

x[n,m] is the predicted pixel in row "n" and column "m";

vx and vy are integer portions of, respectively, the horizontal and vertical motion vectors; and k1, k2, k3 and k4 are constants based on the fractional portions of the motion vectors, as given by:

$$k1=(1-fx).(1-fy);\ k2=fx.(1-fy);\ k3=(1-fx).fy;\ \text{and}\ k4=fx.fy;$$

where fx and fy are the fractional part of the horizontal and vertical motion vectors respectively.

$$x[n,m]=k1.r[n+vx,m+vy]+k2.r[n+vx+1,m+vy]+k3.r[n+vx,m+vy+1]+k4.r[n+vx+1,m+vy+1] \quad \text{(equation 5)}$$

The bi-linear interpolation technique is popular due to its relatively simple implementation. Moreover, since bi-linear interpolation is used in MPEG half-pel interpolation, those skilled in the art tend to favor this technique in cases where interpolation or upsampling is required. Unfortunately, the inventors note that due to the strong low-pass characteristic of quarter pel interpolation, the bi-linear interpolation technique does not provide optimal results. This sub-optimal performance is due, in part, to the stronger than desired low-pass characteristic inherent in fractional pel interpolation, such as ¼ pel interpolation. That is, the simple bi-linear filter attenuates higher frequency components which, in the case of image information, represent edge or fine detail information within an image.

The inventors propose in recovering the scaled pixel information using a sharper (i.e., higher order) cutoff filter. While such a filter may comprise a higher order, traditional low-pass filter, the preferable implementation of interpolator 605 comprises a DCT based interpolation filter, as will be discussed below with respect to FIG. 7.

Advantageously, the DCT based interpolation filter provides filtering that may be restricted to a block or region boundary, such as a boundary originating with an 8×8 pixel block. That is, the DCT filter may be used to provide a low-pass filter (or other transfer function) to a block or bounded sample region without regard to samples that are not within the block or sample region boundary.

FIG. 7 depicts a flow diagram of a DCT-based interpolation filter method. Specifically, the filter method 700 of FIG. 7 upsamples N-point samples to P-point samples, where P is the number of samples to produce the desired resolution. For example, if it is desirable to convert or map 8-point ½ pel samples stored in anchor frame memory 117 into a ¼ pel sample grid, then it is necessary to provide interpolated samples at two times the resolution of the sample (i.e., 16-point samples). In this case, N=8 and P=16. More generally, in the case of converting ½ pel samples into ¼ pel samples, P=2N.

The method 700 is entered at step 705 and proceeds to step 710, where an N-point sample is received, illustratively an 8-point sample. The method 700 then proceeds to step 715.

At step 715 the N-point sample is transformed, via an N-point discrete cosine transform function, to produce an N-point DCT coefficient block, illustratively an 8-point DCT coefficient block. The method 700 then proceeds to step 720.

At step 720 the N-point DCT coefficient block is padded with P-N zeros to form a P-point DCT coefficient block, illustratively 8 zeros (16−8=8). The method 700 then proceeds to step 725.

At step 725, where each DCT coefficient within the P-point DCT coefficient block is scaled by a factor of sqrt(P/N). For example, in the case of converting ½ pel samples into ¼ pel samples (i.e., P=2N), each DCT coefficient within the P-point DCT coefficient block is scaled by a factor of sqrt(2), or 1.414. The method 700 then proceeds to step 730.

At step 730, the P-point DCT coefficient block is transformed, using an inverse DCT function, to produce a plurality sample points. For example, assuming that X is the 8-point DCT of an 8-point sample x (per step 715), and Y is the padded (per step 720) 16-point DCT of x(i.e., Y=[X 0 0 0 0 0 0 0]). It follows that y is the IDCT of Y. Specifically, y is a 16-point sample comprising [y(0) y(1) y(52) y(3) y(4) y(5) y(6) y(7) y(8) y(9) y(10) y11) y(12) y(13) y(14) y(15)]. The method 700 then proceeds to step 735.

At step 735 the appropriate sample points re selected as the interpolated sample points. That is, since the 16 points have alternating phase relationships, it is necessary to determine which points have an appropriate (e.g., positive) phase. For example, in the case mapping the 8-bit $1/_2$ pel points to a $1/_4$ pel grid, the appropriate sample points selected are [y(1) y(3) y(5) y(7) y(9) y(11) y(13) y(15)]. The method then proceeds to step 740.

At step 740 a query is made as to whether there are more samples to be processed. If the query is answered affirmatively, then the method 700 proceeds to step 710, where the next N samples are received. If the query is answered negatively, then the method proceeds to step 745 where it is exited.

The method 700 of FIG. 7 may be used to provide horizontal and/or vertical interpolation. The method 700 of FIG. 7 may be readily modified (i.e., reversed) to provide a downsampling function, as used in the pixel processor 120 of FIG. 1. For example, in the case of downsizing an 8-point sample to produce a 4-point sample. For example, if we need to obtain a 4-point from an 8-point signal, the method 700 is modified as follows: First, an 8-point DCT of the eight samples is computed. Second, the resulting DCT coefficients are scaled by 1/sqrt(2). Third, a four point IDCT is performed using only the lower order scaled DCT coefficients (i.e., the last four DCT coefficients are ignored or truncated) to produce four sample.

It must be noted that the method 700 of FIG. 7 and the inverse variation has been described in terms of computing a "full" DCT or IDCT, without taking advantage of any cascading. It will be known to those skilled in the art that various methods of performing the DCT and IDCT functions may be advantageously employed (e.g., cascading, partial transforms and the like) to reduce computational demands, to reduce memory resource demands (e.g., memory bandwidth) and to adapt to the type of data structures to be processed (e.g., symmetrical pixel blocks, asymmetrical pixel blocks and the like).

Figure 8:
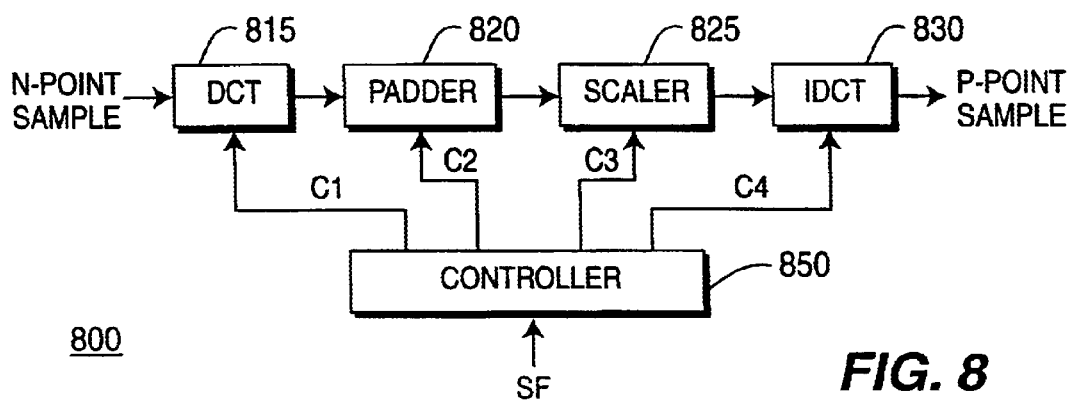
FIG. 8 depicts an embodiment of an interpolator suitable for use in the MPEG-like decoder of FIG. 6.

FIG. 8 depicts an embodiment of an interpolator suitable for use in the MPEG-like decoder of FIG. 6. The interpolator 800 of FIG. 8 comprises a discrete cosine transform (DCT) module 815, a padder module 820, a scaler module 825, an inverse discrete cosine transform (IDCT) module 830 and a controller 850. The interpolator 800 operates to convert an N-point sample, illustratively an N-point pixel block, into a P-point sample, illustratively a P-point pixel block.

The N-point sample is received by the DCT module 815. The DCT module 815, in response to a control signal C1 produced by the controller 850, transforms the N-point sample into an N-point DCT coefficient block. The N-point DCT coefficient block is coupled to the padder module 820.

Padder module 820, in response to a control signal C2 produced by controller 850, "pads" the DCT coefficient block with a number of zeroes equal to the difference between P and N to form a padded DCT coefficient block (i.e., a coefficient block comprising DCT coefficients). The padded DCT coefficient block is coupled to scaler module 825.

Scaler module 825, in response to a control signal C3 produced by the controller 850, scales each DCT coefficient within the padded DCT coefficient block by a factor of sqrt(P/N), as previously described with respect to step 725 of FIG. 7. The output of scaler module 825 is coupled to IDCT module 830.

IDCT module 830, in response to a control signal C4 produced by controller 850, performs an inverse discrete cosine transform of the scaled and padded DCT coefficient block to produce a plurality sample points. The appropriate sample points produced by IDCT module 830 are then selected and coupled to the output as the P-point sample. The selection of the appropriate sample points is discussed above with respect to FIG. 7.

Controller 850, in response to the scaling factor SF, produces control signals C1, C2, C3 and C4. These control signals convey, to their respective controlled modules, control parameters indicative of, e.g., DCT processing (C1), padding amount and quantity (C2), scale factor (C3) and IDCT processing and selection (C4).

Figure 9:
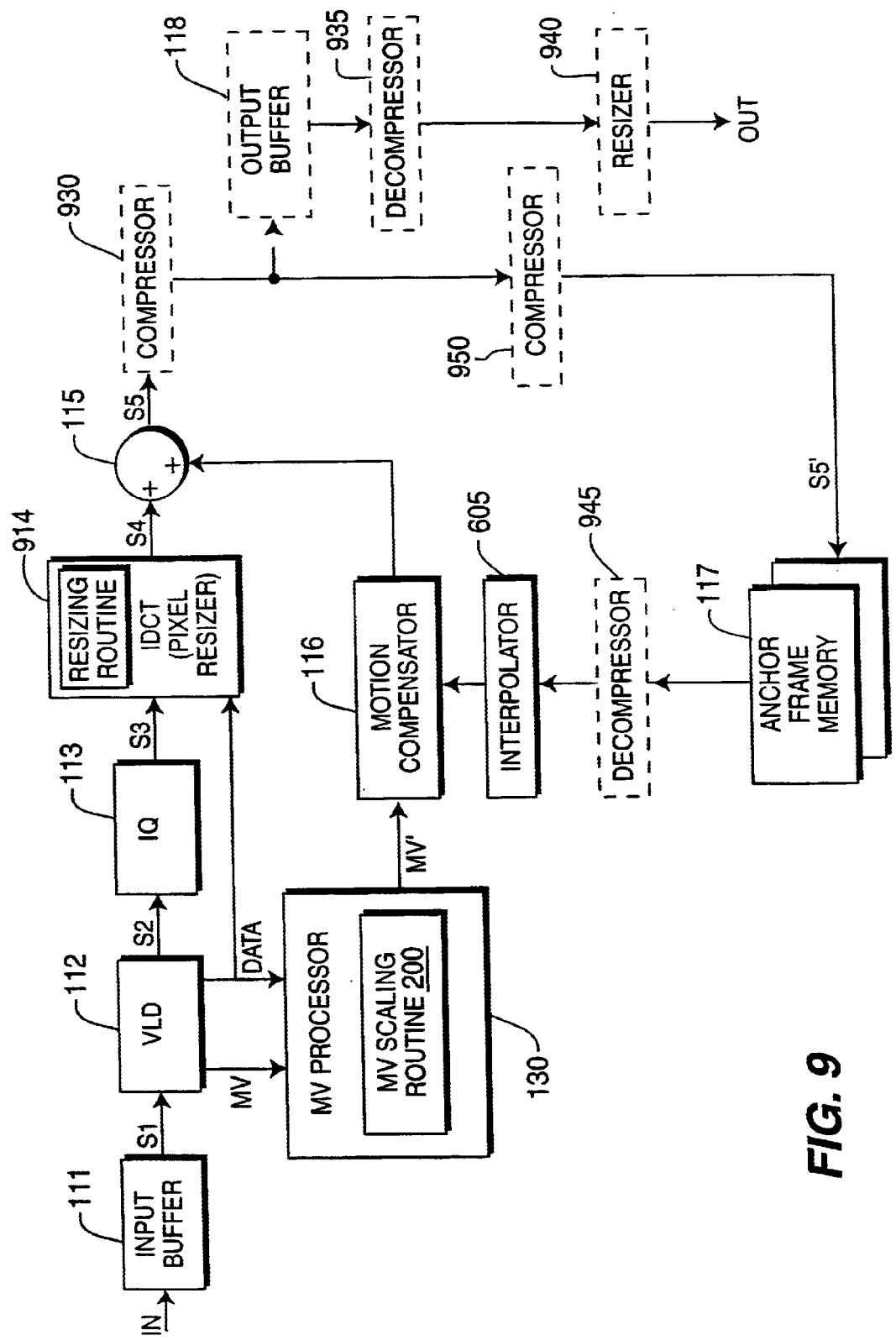
FIG. 9 depicts an alternate embodiment of an MPEG-like decoder.

FIG. 9 depicts an alternate embodiment of an MPEG-like decoder. Specifically, the decoder 900 of FIG. 9 receives and decodes a compressed video information stream IN to produce a video output stream OUT. The video output stream OUT is suitable for coupling to, e.g., a display driver circuit within a presentation device (not shown).

The MPEG-like decoder 900 comprises an input buffer memory module 111, a variable length decoder (VLD) module 112, an inverse quantizer (IQ) module 113, an inverse discrete cosine transform (IDCT) module 114, a summer 115, a motion compensation module 116, an anchor frame memory module 117, a motion vector (MV) resizer 130, an interpolator 605 and, optionally, an output buffer module 118. Optionally, the MPEG-like decoder 900 includes one or more of an output compression module 930, a loop compression module 950, a loop decompression module 945, an output decompression module 935 and an output resizing module 940.

Since the majority of the elements of the MPEG-like decoder 900 of FIG. 9 operate in substantially the same manner as corresponding elements in the MPEG-like decoder 600 of FIG. 6, only the differences between the two figures will be discussed in detail. Briefly, the MPEG-like decoder 900 of FIG. 9 does not include the pixel processor 120 found in the MPEG-like decoder 600 of FIG. 6. However, the MPEG-like decoder 900 of FIG. 9 includes an IDCT module 914 that performs a pixel processing function (e.g., a pixel resizing function) in the DCT domain. Additionally, the MPEG-like decoder 900 of FIG. 9 may include one or more of the optional modules previously mentioned. It should also be noted that the block information stream DATA produced by the VLD module 112 is coupled to the IDCT module 914, in addition to the motion vector processor 130.

The IDCT module 914 performs an inverse discrete cosine transform operation upon bit stream S3 to produce a reduced image size bitstream S4 comprising pixel-by-pixel prediction errors. Importantly, the IDCT operates, on a block by block basis, to reduce the size of the image represented by the information in bit stream S3. Suitable size reduction methods will be discussed below with respect to FIG. 10A and FIG. 10B.

The summer 115 adds the reduced image size pixel-by-pixel prediction error stream S4 to a motion compensated predicted pixel value stream S6 produced by the motion compensation module 116. Thus, the output of summer 115 is, in the exemplary embodiment, a reduced size video stream S5 comprising reconstructed pixel values. The reduced size video stream S5 produced by summer 115 is coupled to the anchor frame memory 117 and the output buffer module 118.

The anchor frame memory module 117 receives and stores the compressed video stream S5. Advantageously, the size of the anchor frame memory module 117 may be reduced by an amount consistent with the compression ratio utilized.

The motion vector resizer 130 receives the motion vector stream MV and block information stream DATA from the VLD 112. The motion vector stream MV comprises motion vector information to be used by the motion compensation module 116 to predict individual macroblocks based upon image information stored in the anchor frame memory module. However, since the image information stored in the anchor frame memory module 117 has been scaled by the IDCT module 116, it is also necessary to scale motion vector data used to predict macroblocks using the scaled pixel information. The scaled motion vectors MV are coupled to the motion compensation module 116 via path MV'.

The motion compensation module 116 accesses the compressed (i.e., scaled) image information stored in memory module 117 via signal path S7 and the scaled motion vector(s) MV' to produce a scaled predicted macroblock. That is, the motion compensation module 116 utilizes one or more stored anchor frames (e.g., the reduced resolution pixel blocks generated with respect to the most recent I-frame or P-frame of the video signal produced at the output of the summer 115), and the motion vector(s) MV' received from the motion vector resizer 130, to calculate the values for each of a plurality of scaled predicted macroblocks forming a scaled predicted information stream.

Figure 10A:
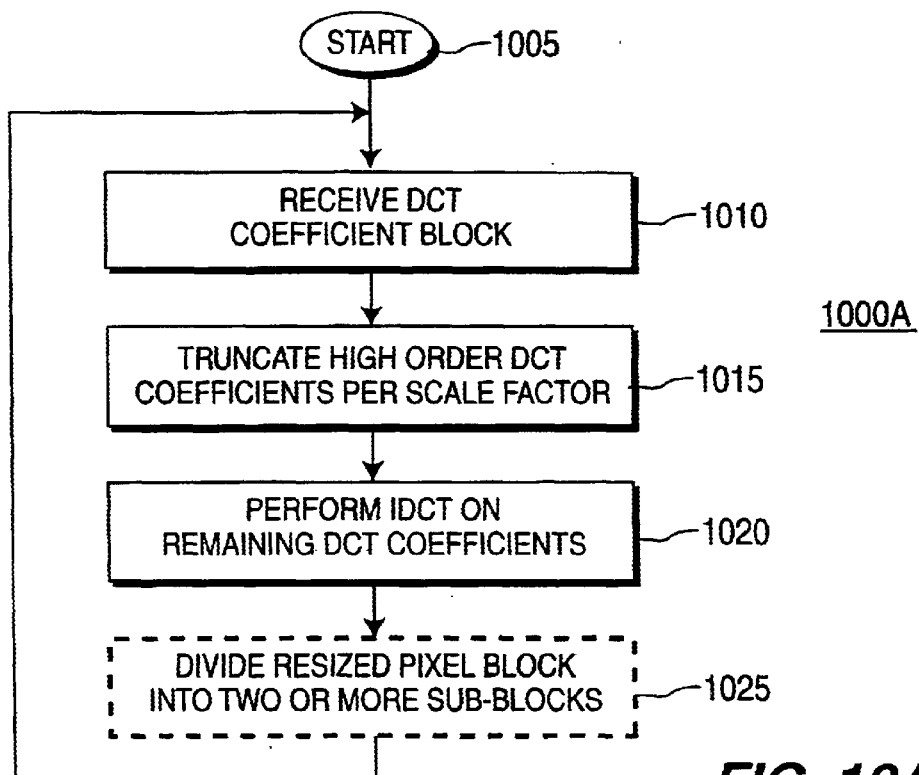
FIGS. 10A and 10B depict a resizing methods suitable for use in the MPEG-like decoder of FIG. 9.

FIG. 10A depicts a resizing method suitable for use in the MPEG-like decoder of FIG. 9. Specifically, FIG. 10A depicts a resizing method 1000A suitable for use in the IDCT module 914 of FIG. 9 that reduces the size of a pixel block by removing data associated with a portion of both the horizontal and vertical spatial frequency information. It must be noted that the vertical and horizontal motion vectors associated with size reduced pixels must be adapted to, e.g., the scaling factor SF used in the resizing routine 1000A. In the case of predictive coded pixel blocks employing field mode encoding, the motion vectors will need to be processed in substantially the same manner as described above with respect to FIG. 2.

The resizing method 1000A is entered at step 1005 and proceeds to step 1010, where a DCT coefficient block is received by the IDCT module 914. The method 1000A then proceeds to step 1015.

At step 1015, a portion of the DCT coefficients are truncated in accordance with the scaling factor SF to be applied to the image or picture represented by the received DCT coefficient block. For example, if the received DCT coefficients comprise an 8×8 DCT coefficient block representative of an 8×8 pixel block, and the resized image or picture is to be ¼ the resolution of the original picture or image (i.e., vertical and horizontal information reduced by ½ each), then all the received DCT coefficients except the 4×4 DCT coefficient "sub-block" representing lower vertical and horizontal spatial frequency information are truncated. The method 1000A then proceeds to step 1020.

At step 1020 the remaining DCT coefficients are subjected to an inverse DCT function to produce a pixel block. The method 1000A then proceeds to optional step 1025, where the pixel block produced by step 1020 is divided into two or more sub-blocks. For example, in the case of an 8×8 DCT coefficient block being converted into an 8×4 (or 4×8) pixel block by the operations of steps 1015 and 1020, the 8×4 (or 4×8) pixel block may be divided into, e.g., a pair of 4×4 pixel sub-blocks. The pixel block produced at step 1020 or, optionally, the pixel sub-blocks produced at step 1025 are then coupled to the adder 115. The method 1000A then proceeds to step 1010, where the next DCT coefficient block is received, and to steps 1015 through 1025.

Figure 10B:
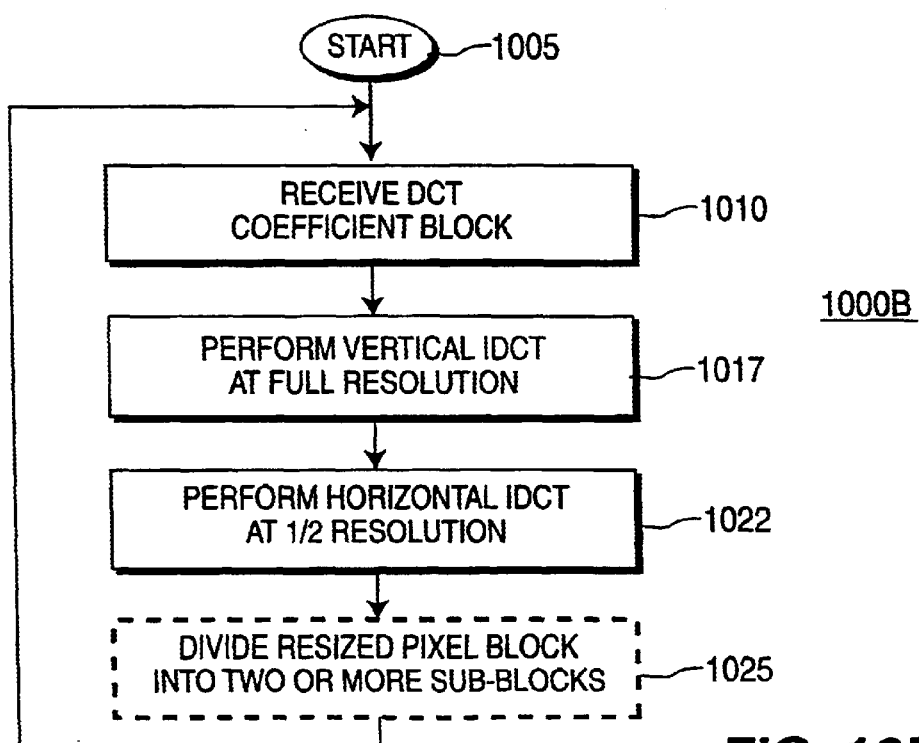

FIG. 10B depicts a resizing method suitable for use in the MPEG-like decoder of FIG. 9. Specifically, FIG. 10B depicts a resizing method 1000B suitable for use in the IDCT module 914 of FIG. 9 that reduces the size of a pixel block by removing data associated with only the horizontal spatial frequency information. That is, the vertical spatial frequency information of a pixel block produced according to the method 1000B of FIG. 10B is not reduced. However, the horizontal spatial frequency information of the pixel block produced according to the method 1000B of FIG. 10B is reduced by a scaling factor (or other appropriate amount). By contrast, both the vertical spatial frequency information and the horizontal spatial frequency information of a pixel block produced according to the method 1000A of FIG. 10A are reduced by, e.g., the scaling factor SF. This is because there is no reduction in the vertical size of the resultant pixel blocks.

Since the method 1000B of FIG. 10B does not reduce vertical spatial frequency information, there is no need to adjust the vertical component of motion vector information associated with predicted pixel blocks processed according to the method 1000B of FIG. 10B. That is, the only motion vector processing that is needed for predicted pixel blocks processed according to the method 1000B of FIG. 10B is a simple scaling of the horizontal motion vectors according to the horizontal scaling factor $SF_H$ (e.g., step 250 of the method 200 of FIG. 2). Thus, the implementation of the motion vector processor may be simplified. Additionally, the motion vector processor does not require the complexity normally associated with scaling vertical motion vectors in field mode or field coded frame mode predicted pixel blocks.

The resizing method 1000B is entered at step 1005 and proceeds to step 1010, where a DCT coefficient block is received by the IDCT module 914. The method 1000A then proceeds to step 1017.

At step 1017, a full vertical resolution IDCT operation is performed using the received IDCT coefficients. That is, a partial IDCT operation is performed in which only the vertical spatial frequency information of the resulting pixel block is derived. The method 1000B then proceeds to step 1022.

At step 1022, a half (or other SF) horizontal resolution IDCT operation is performed using the received IDCT coefficients. That is, a partial IDCT operation is performed in which only half (or some other scaled amount) of the horizontal spatial frequency information of the resulting pixel block is derived. The result of steps 1017 and 1022 is a pixel block having all of the vertical spatial frequency information and, e.g., half of the horizontal spatial frequency information included within the DCT coefficient block. For example, an 8×8 DCT coefficient block representative of an 8×8 pixel block processed according to steps 1017 and 1022 will produce (assuming a horizontal scaling factor $SF_H$ of 2) an 8×4 pixel block. The method 1000A then proceeds to optional step 1025.

At optional step 1025 the resulting pixel block is divided into two or more sub-blocks. For example, in the case of an 8×8 DCT coefficient block being converted into an 8×4 pixel block by the operations of steps 1017 and 1022, the 8×4 pixel block may be divided into, e.g., a pair of 4×4 pixel sub-blocks. The pixel block produced at step 1022 or, optionally, the pixel sub-blocks produced at step 1025 are then coupled to the adder 115. The method 1000A then proceeds to step 1010, where the next DCT coefficient block is received, and to steps 1015 through 1025.

It must be noted that while the method 1000B utilizes a full vertical resolution (i.e., a vertical scaling factor $SF_V$ of 1) and a half horizontal resolution (i.e., a horizontal scaling factor $SF_H$ of 2), other scaling factors may also be used. One of the benefits of using a vertical scaling factor $SF_V$ of 1 is the avoidance of motion estimation processing related to field or field/frame encoded motion vectors. That is, by avoiding vertical pixel block scaling, there is no need to correspondingly calculate vertical motion vector scaling.

As previously noted, the IDCT module 914 receives the block information stream DATA produced by the VLD module 112. In one embodiment of the invention, only those pixel blocks associated with anchor frames (i.e., I-frames or P-frames) are processed according to one of the resizing methods 1000A or 1000B.

Several embodiment of the invention utilizing the optional output compression module 930, loop compression module 950, loop decompression module 945, output decompression module 935, and output resizing module 940 will now be discussed.

It is important to note that the following optional embodiments of the invention may avoid the use of the output buffer 118 entirely. This is because the optional embodiments use the output buffer only for the storage B-frames, since B-frames may require further processing for format conversion purposes. However, since it is less expensive to store a compressed B-frame than an uncompressed,B-frame, it is preferred that the output buffer 118 be used for storing only compressed B-frames in the following embodiments. In the case where the output image does not require further formatting (i.e., resizer 940 is not used), there is no need to store (or compress) the B-frames and, therefore, the output buffer 118 is not used.

In a first optional embodiment of the invention, optional output compression module 930, loop decompression module 945 and output decompression module 935 are included within the MPEG-like decoder 100 of FIG. 1. In this embodiment, loop compression module 950 is not included. However, since further format processing may be required, compressed B-frames are stored in the included output buffer 118. This embodiment advantageously reduces the amount of memory used for both the anchor frame memory 117 and the output buffer 118.

In a second optional embodiment of the invention, optional loop compression module 950 and loop decompression module 945 are included within the MPEG-like decoder 100 of FIG. 1. In this embodiment, output compression module 930 and output decompression module 935 are not included. This embodiment advantageously reduces the amount of memory used for the anchor frame memory 117, while requiring the use of only one decompression module. Additionally, since there is no need to store B-frames prior to reformatting, the output buffer 118 is not used.

In either of the first and second optional embodiments of the invention, the optional resizer 940 may be included or excluded. Where included, the resizer may be used to increase or decrease the resolution or viewing format of the video information stored within the output buffer 118. For example, in the case of a highly integrated MPEG-like decoder 100, where the compression and decompression function are predefined (e.g., a high volume integrated circuit), the resizer may be used to adapt the format of the output video signal to a native display device format prior to presentation on the native display device.

The optional output compression module 930 and the optional loop compression module 950 compress the video stream S5 on a block by block basis to produce a compressed video stream S5'. Either compression module may be implemented according to known techniques, such as those described with respect to pixel processor 120 of the MPEG-like decoder 100 to FIG. 1. The purpose of the output compression module 930 is to reduce the amount of memory needed to implement the anchor frame memory 117.

Additionally, Either compression module may be implemented according to the teachings of U.S. Patent application Ser. No. 09/127,450, filed on Jul. 31, 1998 and incorporated herein by reference in its entirety. An overview of a method according to the teachings of this patent. will now be discussed with respect to FIG. 11.

Figure 11:
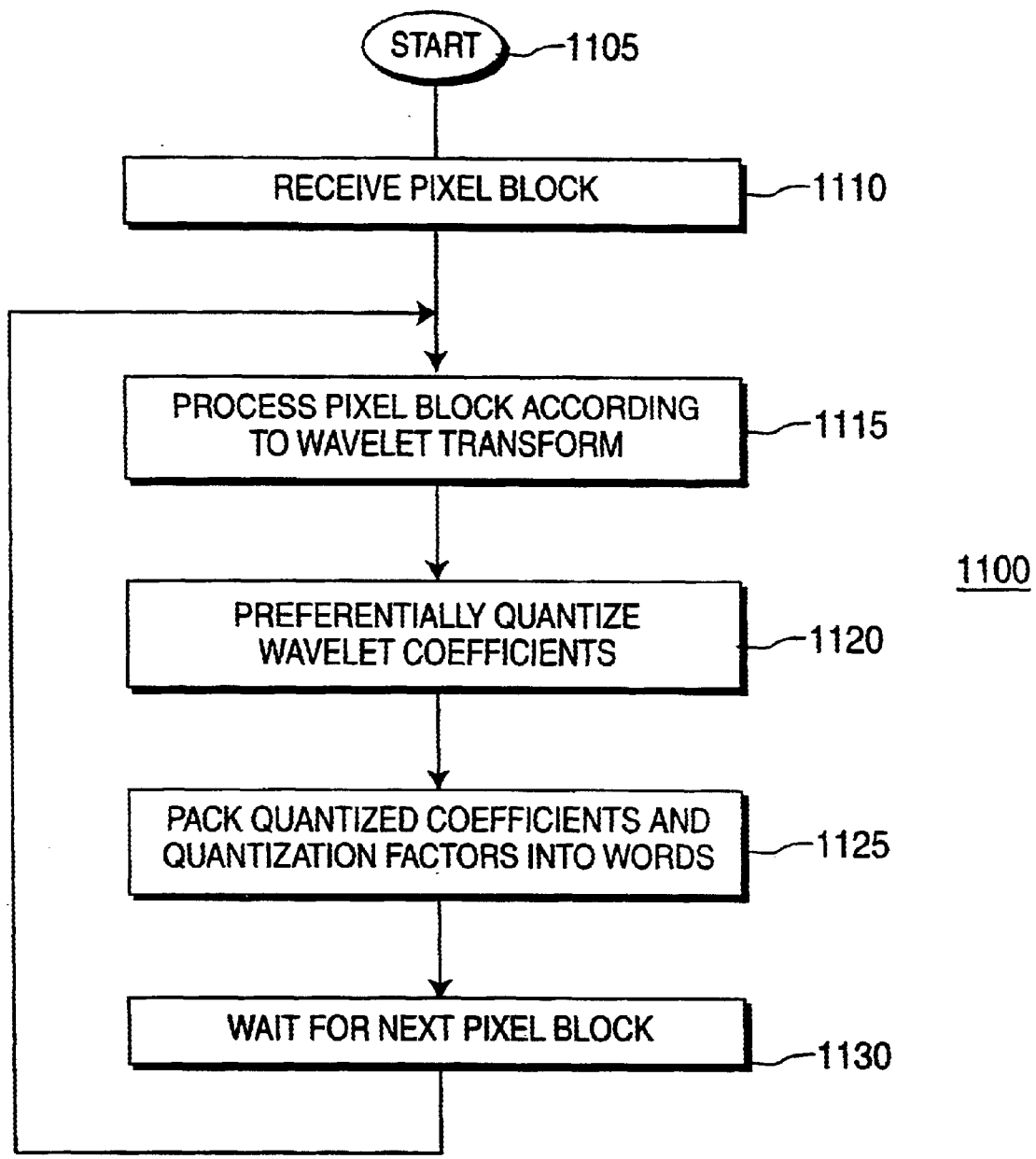
FIG. 11 depicts a flow diagram of a compression method suitable for use in the MPEG-like decoder of FIG. 9.

FIG. 11 depicts a flow diagram of a compression method suitable for use in the MPEG-like decoder of FIG. 9. Specifically, an output compression module 930 or loop compression module 950 utilizing the method 1100 of FIG. 11 operates on a pixel block by pixel block basis (e.g., a 4×4, 4×8 or 8×8 pixel block) to receive (step 1110) a pixel block and compress (step 1115) the received pixel block by processing the block according to a wavelet transform (illustratively a Haar wavelet transform). The resulting wavelet coefficients are then preferentially quantized (step 1125) in a manner allocating more bits to those coefficients representing information more readily discernible to a viewer. The scaled wavelet coefficients and the associated scaling factors are the packed (step 1125) to form a word. The scaled, quantized, wavelet domain representation of a pixel block is then coupled to the compression module output as part of compressed video stream S5'.

It is noted by the inventors that such a scaled, quantized, Haar domain representation of the anchor frame requires approximately half the memory required for the pixel domain anchor frame representation. Thus, the memory requirements of anchor frame memory module 117 are reduced by a factor of two.

Since the anchor frame memory 117 is used to store image information that has been compressed, it is necessary to decompress the image information prior to coupling the stored information to the motion compensation module 116. Loop decompression module 945 is used to perform this function. Similarly, since the output buffer (at least in optional embodiment one) is used to store compressed image information, it is necessary to decompress the image information prior to sending the decompressed image information to the optional resizing module 940 or a presentation device (not shown). The output decompression module 935 is used to perform this function.

Decompression modules 935 and 945 essentially mirror the operation of the compression modules 930 and/or 950 described above. That is, in the case of compression functionality implemented according to the method of FIG. 11, decompression modules 935 and/or 945 receives each preferentially quantized, wavelet domain representation of a pixel block from the anchor frame memory 117 (or output compression module 930). The received word is then subjected to an unpacking process to retrieve the preferentially quantized wavelet coefficients and the associated scaling factors. The scaling factors are then used in an inverse quantization process to produce a wavelet coefficient block. The wavelet coefficient block is then subjected to an inverse wavelet transform process (e.g., an inverse Haar transform process) to produce a corresponding pixel block. The corresponding pixel block is coupled to, e.g., the motion compensation module 116, the interpolator 605 or the output buffer 118.

It should be noted that in the case of a horizontal-only scaling of a reference pixel block, the interpolator 605 of FIGS. 6 and 8, and the interpolation method 700 of FIG. 7, may be modified to perform horizontal interpolations only, thereby reducing memory and computational complexity.

While the invention has been described primarily in terms of scaling motion vectors and pixel domain information by a factor of two, it must be noted that the invention is well suited to other scaling factors (integer and non-integer). Moreover, while the invention has been described primarily in terms of scaling down (i.e., reducing pixel domain information prior to storage), the invention is well suited to scaling up (i.e., increasing pixel domain information). Such scaling up of pixel domain information and motion vector information is especially applicable to applications requiring the presentation of low resolution image information using a high resolution display device. For example, the presentation of standard definition television (SDTV) on a high definition television (HDTV) display device. One skilled in the art and informed by the teachings of the present invention will readily devise additional and various modifications to the above-described embodiments of the invention.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. In a block-based system for decoding a compressed information stream including predicted pixel blocks, said predicted pixel blocks being associated with one or more scaled reference pixel blocks via respective scaled motion vector information, a method for adapting a first resolution of a scaled reference pixel block to a second resolution of said scaled motion vector Information comprises the step of filtering, using a discrete cosine transform (DCT) filter, said scaled reference pixel block.

2. The method of claim 1, wherein said step of filtering comprises the steps of;

transforming, using a discrete cosine transform (DCT), said scaled reference pixel block to produce at least one DCT coefficient block;

padding, according to a difference between said first and second resolutions, said at least one DCT coefficient block;

scaling, according to a square root of a ratio of said first resolution to said second resolution, said at least one DOT coefficient block; and transforming, using an Inverse DCT function (IDCT), said padded and scaled at least one DCT coefficient block to provide a reference pixel block having said second resolution.

3. The method of claim 1, wherein each of said one or more scaled reference pixel blocks is associated with a respective DCT coefficient block within said compressed information stream, each of said one or more scaled reference pixel blocks being formed according to the steps of:

truncating, per at least one of a horizontal scaling factor and a vertical scaling factor, a plurality of DCT coefficients within said respective DCT coefficient block to form a respective truncated DCT coefficient block; and transforming, using an inverse DCT transform, said respective truncated DCT coefficient block to form said respective scaled reference pixel block.

4. The method of claim 1, wherein each of said one or more scaled reference pixel blocks is associated with a respective DCT coefficient block within said compressed information stream, each of said one or more scaled reference pixel blocks being formed according to the steps of:

transforming, using a vertical inverse DCT transform having a resolution determined by a vertical scaling factor, said respective DCT coefficient block to form a first portion of said respective scaled reference pixel block; and transforming, using a horizontal inverse DCT transform having a resolution determined by a horizontal scaling factor, said respective DCT coefficient block to form a remaining portion of said respective scaled reference pixel block.

5. The method of claim 4, wherein said vertical scaling factor is equal to one and said horizontal scaling factor is equal to 2.

6. The method of claim 1, wherein said method further includes the steps of:

dividing each of said scaled reference pixel blocks into a plurality of respective pixel sub-blocks;

compressing said respective pixel sub-blocks using a predetermined compression ratio to form a plurality of respective compressed pixel sub-blocks; and storing, in a memory, said plurality of respective compressed pixel sub-blocks.

7. The method of claim 6, wherein said method further includes the steps of:

retrieving, from said memory, compressed pixel sub-blocks associated with said scaled reference pixel block and said scaled motion vector information; and decompressing, according to said predetermined compression ratio, said compressed pixel sub-blocks associated with said scaled reference pixel block to recover said scaled reference pixel block.

8. The method of claim 7, wherein said predetermined compression ratio is two.

9. In a block-based system for decoding a compressed image stream to produce a decompressed and scaled image stream, said compressed image stream including predicted and non-predicted image-representative blocks, each of said predicted and non-predicted image-representative blocks being associated with a DCT coefficient block, each of said predicted image-representative blocks being associated with at least one motion vector, a method comprising the steps of:
scaling, per a horizontal scaling factor, each of said predicted image-representative blocks to form respective horizontally scaled pixel blocks; and
scaling, per said horizontal scaling factor, a horizontal component of each of said motion vectors to produce scaled motion vectors.

10. The method of claim 9, wherein said step of scaling each of said predicted image-representative blocks comprises the steps of:
truncating, per said horizontal scaling factor, a plurality of DCT coefficients within a respective DCT coefficient block to produce a respective scaled DCT coefficient block; and
transforming, using an inverse discrete transform, said respective scaled DCT coefficient block to produce said respective horizontally scaled pixel block.

11. The method of claim 9, wherein said step of scaling each of said predicted image-representative blocks comprises the steps of:
transforming, using a full resolution vertical inverse DCT transform, a respective DCT coefficient block to form a first portion of a said respective horizontally scaled pixel block; and
transforming, using a horizontal inverse DCT transform having a resolution determined by said horizontal scaling factor, said respective DCT coefficient block to form a remaining portion of said respective horizontally scaled pixel block.

12. The method of claim 9, further comprising the steps of:
dividing said resized pixel blocks into a plurality of respective pixel sub-blocks; and
compressing each of said plurality of respective pixel sub-blocks to form a respective plurality of compressed pixel sub-blocks.

13. The method of claim 9, further comprising the step of adapting, using a discrete cosine transform (DCT) filter, a resolution of each of said horizontally scaled pixel blocks to a resolution of said horizontally scaled motion vector.

14. The method of claim 13, wherein said step of adapting comprises the steps of:
transforming, using a discrete cosine transform (DCT), each of said horizontally scaled pixel blocks to produce at least one corresponding DCT coefficient block;
padding, according to a difference between said first and second resolutions, said at least one corresponding DCT coefficient block;
scaling, according to a square root of a ratio of said first resolution to said second resolution, said at least one corresponding DCT coefficient block; and
transforming, using an inverse DCT function (IDCT), said padded and scaled at least one corresponding DCT coefficient block to provide a corresponding horizontally scaled pixel block having said second resolution.

15. In an MPEG-like video decoder, apparatus comprising:
a pixel processor, for receiving decoded reference pixel blocks and producing therefrom corresponding scaled reference pixel blocks according to a scaling factor;
a motion vector processor, for receiving motion vector information associated with a predicted pixel block and producing therefrom a scaled motion vector according to said scaling factor; and
an interpolator, for interpolating additional pixels within said scaled reference pixel blocks to form Interpolated pixel blocks, said interpolated pixel blocks and said scaled motion vector having substantially similar resolutions.

16. The apparatus of claim 15, wherein said interpolator comprises a discrete cosine transform (DCT) filter.

17. The apparatus of claim 16, wherein said DCT filter comprises:
a DCT module, for transforming, using a discrete cosine transform (DCT), each of said scaled reference pixel blocks to produce at least one corresponding DCT coefficient block;
a padder, for padding, according to a difference between said first and second resolutions, said at least one corresponding DCT coefficient block;
a scaler, for scaling, according to a square root of a ratio of said first resolution to said second resolution, said at least one corresponding DCT coefficient block; and
an inverse DCT module, for transforming, using an inverse DCT function (IDCT), said padded and scaled at least one corresponding DCT coefficient block to provide a corresponding reference pixel block having said second resolution.

18. The apparatus of claim 17, further comprising:
a controller, for controlling at least one of said DCT module, said padder, said scaler and said IDCT module in response to an indicium of a desired scale factor.

19. The apparatus of claim 16, wherein said DCT filter transforms, using a discrete cosine transform (DCT), each of said scaled reference pixel blocks to produce at least one DCT coefficient block, pads, according to a difference between said first and second resolutions, said at least one DCT coefficient block, scales, according to a square root of a ratio of said first resolution to said second resolution, said at least one DCT coefficient block, and transforms, using an inverse DCT function (IDCT), said padded and scaled at least one DCT coefficient block to provide a reference pixel block having said second resolution.

20. The apparatus of claim 15, further comprising:
a compressor, for compressing said scaled reference pixel blocks to produce compressed and scaled reference pixel blocks;
a memory, for storing said compressed and scaled reference pixel blocks; and
a decompressor, for decompressing said compressed and scaled reference pixel blocks stored In said memory to produce scaled reference pixel blocks for said interpolator.

21. The apparatus of claim 20, further comprising:
a second decompressor, for decompressing and coupling to an output said compressed and scaled reference pixel blocks produced by said compressor.

22. The apparatus of claim 20, further comprising:

an output buffer, for storing at least a portion of said compressed and scaled reference pixel blocks produced by said compressor;

a second decompressor, for decompressing said compressed and scaled reference pixel blocks produced by said compressor; and a resizer, for adapting a format parameter of said scaled reference pixel blocks provided by said second decompressor.

23. The apparatus of claim 20, wherein said compressor transforms, using a wavelet transform, said scaled reference pixel blocks to produce corresponding blocks of wavelet coefficients, preferentially quantizes said corresponding wavelet coefficients such that those coefficients representing lower spatial resolution information receive greater bit allocations, and packs said quantized corresponding wavelet coefficients Into respective words for storage in said memory.

24. The apparatus of claim 23, wherein said wavelet transform comprises a Haar transform.

* * * * *